(12) United States Patent
Venkatraman

(10) Patent No.: US 8,509,732 B1
(45) Date of Patent: Aug. 13, 2013

(54) METHOD AND SYSTEM FOR AUTOMATICALLY SELECTING AND CONTACTING AN EMERGENCY CONTACT PERSON BASED ON LOCATION

(75) Inventor: Kumar Venkatraman, Bangalore (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 13/429,941

(22) Filed: Mar. 26, 2012

(51) Int. Cl.
*H04M 11/04* (2006.01)

(52) U.S. Cl.
USPC .............. 455/404.2; 455/521; 455/456.1; 455/456.3; 455/457; 455/507; 455/414.2

(58) Field of Classification Search
USPC .......... 455/521, 456.1, 456.3, 457, 507, 455/414.2
See application file for complete search history.

(56) References Cited

U.S. PATENT DOCUMENTS

| 2005/0153681 A1* | 7/2005 | Hanson | 455/404.2 |
| 2010/0003954 A1* | 1/2010 | Greene et al. | 455/404.1 |
| 2011/0281547 A1* | 11/2011 | Cordero | 455/404.1 |

* cited by examiner

*Primary Examiner* — Kwasi Karikari

(74) *Attorney, Agent, or Firm* — McKay and Hodgson, LLP; Philip McKay; Sean P. Lewis

(57) ABSTRACT

A list of two or more emergency contact persons and contact information for the two or more emergency contact persons is created. The locations of the emergency contact persons on the emergency contact list are then tracked. When an emergency contact feature is activated by a user, the location of the user/emergency and the locations of the emergency contact persons on the emergency contact list are automatically determined. The emergency contact person that is estimated to be geographically/physically, and/or temporarily, closest to the user, is then automatically identified and automatically contacted.

36 Claims, 2 Drawing Sheets

METHOD AND SYSTEM FOR AUTOMATICALLY SELECTING AND CONTACTING AN EMERGENCY CONTACT PERSON BASED ON LOCATION

BACKGROUND

Currently, various phones and mobile computing systems support configurable speed dial functionality that can be programmed and used to make contact with any desired party by pressing, and/or otherwise activating, one or more buttons or icons, such as a designated numerical digit and symbol combination. Some phones and mobile computing systems specifically provide this configurable speed dial functionality for the purpose of allowing the user to program one or more contacts, or, more correctly, contact data such as a phone number associated with the one or more contacts, so that the one or more contacts can be easily accessed when needed in an emergency.

As a specific example, a user can currently program a mobile phone speed dial feature so that a ten digit telephone number associated with a first specified party is automatically dialed when the user presses the "#" symbol, or a speed dial button, followed by the numerical button "1" and a different ten digit telephone number associated with a second specified party is automatically dialed when the user presses the "#" symbol, or a speed dial button, followed by the numerical button "2".

These currently available speed dial systems can be quite helpful and, in many cases, can allow a user to establish communications with a desired contact person fairly quickly. However, the currently available speed dial contact systems are largely static and "dumb" in that the contact persons are chosen based solely on the user's input and no consideration is given to the location of the user at the time of the attempted contact, or the location, and/or status, of the contact person at the time of the attempted contact. Consequently, currently available speed dial systems have significant limitations and drawbacks when used as emergency contact systems.

For instance, using currently available speed dial contact systems, a user may program a mobile phone so that a ten digit telephone number associated with a first contact person who lives a block away from the user is automatically dialed when the user presses the "#" symbol, or a speed dial button, followed by the numerical button "1". In this specific illustrative example, it could also be the case that the user has programed the mobile phone so that a ten digit telephone number associated different, second, contact person who lives two miles away is automatically dialed when the user presses the "#" symbol, or a speed dial button, followed by the numerical button "2".

In this specific example, in the event of an emergency at home, the user, with perhaps little time to act, may choose the first contact person who lives a block away from the user by pressing the "#" symbol, or a speed dial button, followed by the numerical button "1". In this instance, an attempt to contact the first contact person will be made. However, it may be that at the time of the emergency, the first contact person is not at home a block away but is actually across town, thirty miles away in traffic. Consequently, the first contact person can do little for the user except perhaps place a likely redundant call to 911.

In this specific example, further assume that, unknown to the user because of the limitations of currently available speed dial contact systems, the second contact person who lives two miles away was actually shopping at a grocery store a mere one-half mile from the user at the time of the emergency. Consequently, the user would have been much better served if the user had chosen the second contact person to call. However, using currently available speed dial contact systems the user would have no way of knowing this and, at best, would have to manually press the "#" symbol, or a speed dial button, followed by the numerical button "2" after the user tried the first contact person and became aware of the first contact person's physical and temporal distance from the emergency location. This would require additional, and often precious, time and/or considerable effort and clarity of thought/action by the user, at a time when to user is likely under the considerable stress of the emergency.

Given the hectic, and highly mobile, lifestyles of many people today, the situation described above is a highly likely scenario. Consequently, using currently available speed dial contact systems as emergency contact systems, precious time and effort can be wasted contacting the arguably "wrong" emergency contact person for a given emergency and location.

What is needed is a method and system that, once activated by the user, automatically selects an emergency contact person, from a list of emergency contact persons, that is physically, and/or temporally, closest to the user and/or the emergency location, i.e., automatically selects the emergency contact person that can get to the user and/or the emergency location in the shortest estimated time.

SUMMARY

In accordance with one embodiment, a system and method for automatically selecting and contacting an emergency contact person based on location includes a process for automatically selecting and contacting an emergency contact person based on location whereby an emergency contact list including two or more emergency contact persons designated by the user, and contact information for the two or more emergency contact persons, is created. In one embodiment, the emergency contact persons on the emergency contact list have their location tracked, in one embodiment via one or more mobile computing systems associated with the emergency contact persons.

In one embodiment, the emergency contact list is associated with one or more buttons, icons, voice data, and/or features, on a user computing system associated with the user such that when the one or more buttons, icons, voice data, and/or features are activated, the location of the emergency is determined, e.g., the location of the user computing system is determined, and the locations of the emergency contact persons on the emergency contact list are automatically determined. In one embodiment, the emergency contact person that is estimated to be geographically/physically, and/or temporarily, closest to the user, is then automatically identified and automatically contacted.

Using the system and method for automatically selecting and contacting an emergency contact person based on location as disclosed herein, a process is provided that, once activated by the user, automatically selects an emergency contact person, from a list of emergency contact persons, that is physically, and/or temporally, closest to the user and/or the emergency location, i.e., automatically selects the emergency contact person that can get to the user and/or the emergency location in the shortest estimated time.

Figure 1:
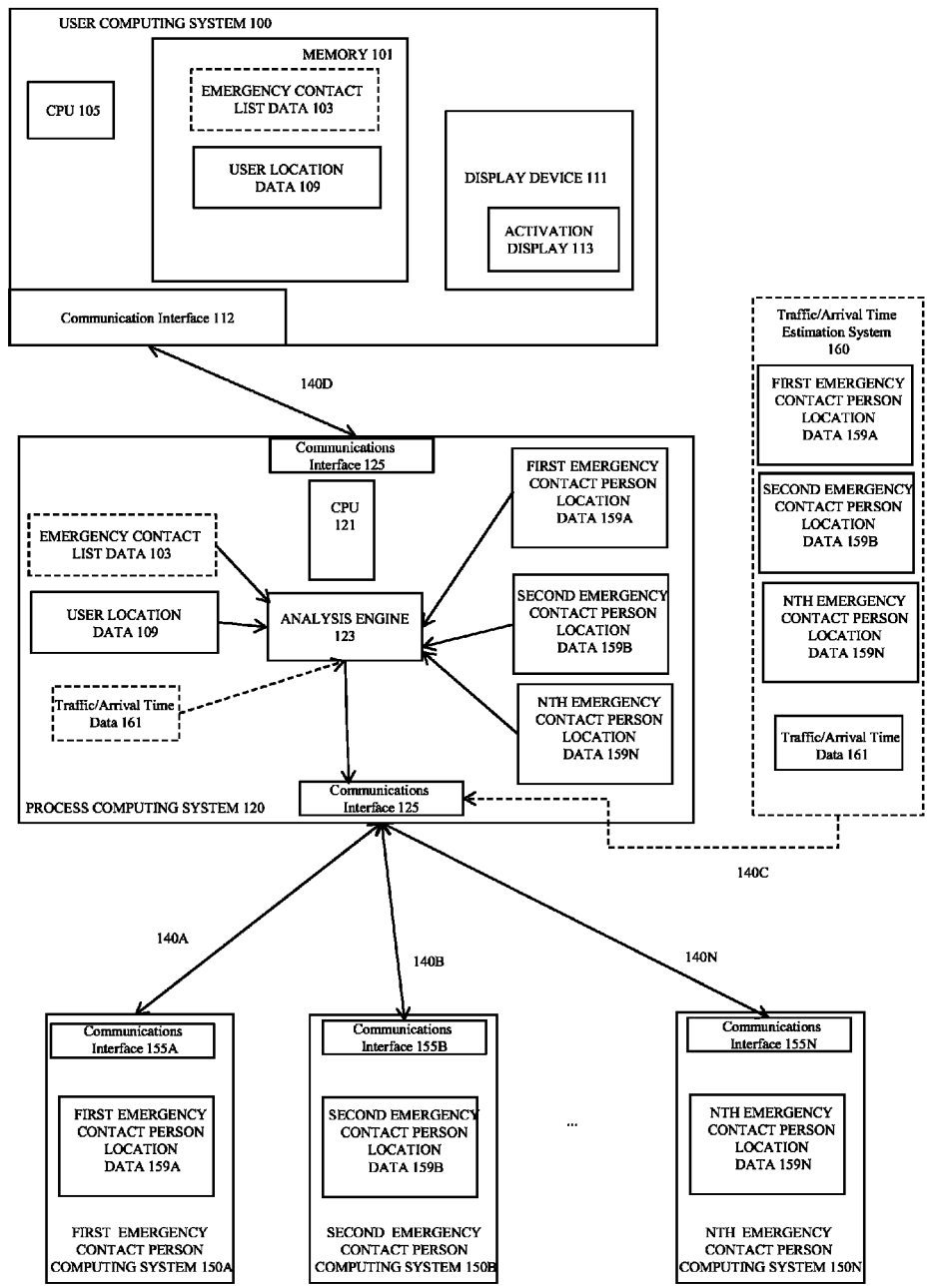
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a system and method for automatically selecting and contacting an emergency contact person based on location includes a process for automatically selecting and contacting an emergency contact person based on location whereby an emergency contact list including two or more emergency contact persons designated by the user, and contact information/data for the two or more emergency contact persons, is created.

In one embodiment, the emergency contact list data, i.e., data indicating the emergency contact persons and the contact information for the emergency contact persons, is provided by the user through one or more user computing systems.

As used herein, the term "computing system", includes, but is not limited to: a desktop computing system; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

Herein, the terms "mobile computing system" and "mobile device" are used interchangeably and include, but are not limited to: a portable computer; a two-way pager; a cellular telephone; a smart phone; a tablet computing system; a notebook computing system; a digital wireless telephone; a Personal Digital Assistant (PDA); a media player, i.e., an MP3 player and/or other music and/or video player; an Internet appliance; or any other mobile device and/or computing system that includes components that can execute all, or part, of any one of the processes and/or operations as described herein. In addition, as used herein, the term mobile computing system and/or mobile device, can denote, but is not limited to, computing systems made up of multiple: wireless devices; cellular telephones; smart phones; digital telephones; two-way pagers; PDAs; media players; or any desired combination of these devices and/or computing systems, that are coupled to perform the processes and/or operations as described herein.

In one embodiment, one or more mobile computing systems are connected by one or more mobile communication networks and/or communications channels, such as, but not limited to: any general network, communications network, or general network/communications network system; a cellular network; a wireless network; a combination of different network types, or other wireless, wired, and/or a wireless and wired combination network; a public network; a private network; a satellite network; a cable network; or any other network capable of allowing communication between two or more computing systems, as discussed herein, and/or available or known at the time of filing, and/or as developed after the time of filing.

In various embodiments, the contact information for the two or more emergency contact persons designated by the user may be a telephone number for the emergency contact person, an e-mail address for the emergency contact person, SMS message contact data for the emergency contact person, and/or any other contact information for the emergency contact person as discussed herein, and/or as known/available in the art at the time of filing, and/or as developed/made available after the time of filing.

In one embodiment, the emergency contact persons on the emergency contact list agree to be listed and agree to have their location tracked, in one embodiment via one or more mobile computing systems associated with the emergency contact persons.

In one embodiment, the geographical locations of the mobile computing systems associated with the emergency contact persons on the emergency contact list are tracked/monitored using a Global Positioning Satellite (GPS) system and/or a GPS capability provided with the mobile computing systems. In various embodiments, the geographical locations of the mobile computing systems associated with the emergency contact persons on the emergency contact list are determined based on analysis of a communication signal used and/or emitted by the mobile computing systems and/or the relay stations used by the mobile computing systems. In various embodiments, the geographical locations of the mobile computing systems associated with the emergency contact persons on the emergency contact list are provided by the mobile computing systems themselves via one or more data links. In various embodiments, the geographical locations of the mobile computing systems associated with the emergency contact persons on the emergency contact list are determined and/or provided by any method, means, mechanism, or procedure for determining a position of a computing system as discussed herein, and/or as known in the art at the time of filing, and/or as developed after the time of filing.

Numerous means, methods, systems, algorithms, procedures, and processes are known in the art for obtaining location data associated with a computing system. Consequently, a more detailed discussion of any particular means, method, system, algorithm, procedure, and process for obtaining location data associated with a computing system is omitted here to avoid detracting from the invention.

In one embodiment, the emergency contact list data is stored on one or more computing systems, mobile computing systems, server computing systems, and/or databases using any method, means, process, or procedure, as discussed herein, and/or as known in the art at the time of filing, and/or as developed/made available after the time of filing.

In one embodiment, the emergency contact list is associated with one or more buttons, icons, voice data, and/or features on a user computing system associated with the user such that when the one or more buttons, icons, voice data, and/or features on the user computing system are activated, a process for determining the emergency contact person that is estimated to be geographically/physically, and/or temporarily, closest to the user, i.e., the user computing system or an emergency location designated by the user through the user computing system, is initiated.

In one embodiment, a two-way synchronization is performed at periodic intervals such that the location information for the user and the location information of the two or more emergency contact persons on the emergency contact list are obtained and stored locally on the user computing system. In one embodiment, the nearest emergency contact person is also determined at periodic intervals automatically to minimize processing wait time in the event of an emergency.

In one embodiment, once the one or more buttons, icons, voice data, and/or features on the user computing system are activated, the location of the emergency is determined, e.g., the location of the user computing system is determined, or an emergency location designated by the user is determined. In one embodiment, the approximate locations of the two or more emergency contact persons on the emergency contact list are also determined.

In one embodiment, the geographical location of the user computing system is tracked/monitored using a GPS system and/or a GPS capability provided with the user computing system. In various embodiments, the geographical location of the user computing system is determined based on analysis of a communication signal used and/or emitted by the user computing system and/or the relay stations used by the user computing system. In various embodiments, the geographical location of the user computing system is provided by the user computing system itself via one or more data links. In various embodiments, the geographical location of the user computing system is determined and/or provided by any method, means, mechanism, or procedure for determining a position of a computing system as discussed herein, and/or as known in the art at the time of filing, and/or as developed after the time of filing.

Numerous means, methods, systems, algorithms, procedures, and processes are known in the art for obtaining location data associated with a computing system. Consequently, a more detailed discussion of any particular means, method, system, algorithm, procedure, and process for obtaining location data associated with a computing system is omitted here to avoid detracting from the invention.

In one embodiment, data indicating the physical geographical locations of the two or more emergency contact persons and the location of the emergency is automatically analyzed by one or more processors to determine the physical distance between the geographical locations of the two or more emergency contact persons on the emergency contact list and the location of the emergency.

In one embodiment, the emergency contact person determined to be closest to the location of the emergency is selected and contacted automatically using the contact information for the selected emergency contact person from the emergency contact list.

As noted above, in various embodiments, the contact information for the selected emergency contact person may be a telephone number for the emergency contact person, an e-mail address for the emergency contact person, SMS message contact data for the emergency contact person, and/or any other contact information for the selected emergency contact person as discussed herein, and/or as known/available in the art at the time of filing, and/or as developed/made available after the time of filing.

In one embodiment, traffic data/arrival time data is obtained from one or more sources and incorporated so that the emergency contact person that is estimated to be temporarily nearest to the location of the emergency is selected and contacted automatically based on the physical geographical locations of the two or more emergency contact persons on the emergency contact list, the physical distance between the geographical locations of the two or more emergency contact persons on the emergency contact list and the location of the emergency, and the estimated time it will take the two or more emergency contact persons on the emergency contact list to reach the location of the emergency including estimated traffic delays.

In one embodiment, in addition to, or in place of, contacting the nearest emergency contact person, a determination of the nearest emergency services, such as the nearest fire, medical, hospital, or police, service is made and the identified nearest emergency service is automatically contacted. This feature is of particular benefit in countries/regions that have not adopted a universal emergency contact number such as "911".

Hardware System Architecture

FIG. 1 is a block diagram of an exemplary hardware architecture for implementing one embodiment of a system and method for automatically selecting and contacting an emergency contact person based on location, such as exemplary process 200 (FIG. 2) discussed herein, that, returning to FIG. 1, includes: a user computing system 100, e.g., a mobile computing system accessible by a user; a process computing system 120, e.g., a computing system associated with a provider of a process for automatically selecting and contacting an emergency contact person based on location; a first emergency contact person computing system 150A, e.g., a mobile computing system accessible by a first emergency contact person; a second emergency contact person computing system 150B, e.g., a mobile computing system accessible by a second emergency contact person; an "Nth" emergency contact person computing system 150N, e.g., a mobile computing system accessible by an "Nth" emergency contact person; an optional traffic/arrival time estimation system 160; and communication channels 140A, 140B, 140N, 140C, and 140D.

As seen in FIG. 1, computing system 100 typically includes a central processing unit (CPU) 105, a communications interface 112; and a memory 101.

Computing system 100 can be any computing system as discussed herein and/or as known in the art at the time of filing and/or as developed thereafter, that includes components that can execute all, or part, of a process for automatically selecting and contacting an emergency contact person based on location in accordance with at least one of the embodiments as described herein.

In one embodiment, memory 101 includes all, or part, of emergency contact list data 103. In various embodiments, emergency contact list data 103 includes the contact information for first emergency contact person computing system 150A, second emergency contact person computing system 150B, and "Nth" emergency contact person computing system 150N, as designated by the user of user computing system 100. As also noted above, the contact information may be a telephone number, an e-mail address, SMS message contact data, and/or any other contact information as discussed herein, and/or as known/available in the art at the time of filing, and/or as developed/made available after the time of filing.

In one embodiment, memory 101 includes user location data 109. As noted above, in one embodiment, user location data 109 includes data indicating the geographical location of user computing system 100 that is tracked/monitored using a GPS system and/or a GPS capability provided with user computing system 100 (not shown). In various embodiments, user location data 109 is determined based on analysis of a communication signal used and/or emitted by user computing system 100 and/or the relay stations used by user computing system 100. In various embodiments, user location data 109 is provided by user computing system 100 itself via one or more data links. In various embodiments, user location data 109 is determined and/or provided by any method, means, mechanism, or procedure for determining a position of a computing system as discussed herein, and/or as known in the art at the time of filing, and/or as developed after the time of filing.

As noted above, in one embodiment, user location data 109 is obtained/recorded at regular/periodic intervals, such as every second, every few seconds, every minute, every few minutes, etc.

As seen in FIG. 1, user computing system 100 includes display device 111 that displays an activation display 113. As discussed in more detail below, emergency contact list data 103 is associated with one or more buttons, icons, voice data, and/or features, shown in activation display 113 such that when the one or more buttons, icons, voice data, and/or features of activation display 113 are activated, the location of the emergency is determined using user location data 109, e.g., the location of user computing system 100 is determined, and the locations of first emergency contact person computing system 150A, second emergency contact person computing system 150B, and "Nth" emergency contact person computing system 150N, are automatically determined. In one embodiment, the identified one of first emergency contact person computing system 150A, second emergency contact person computing system 150B, and "Nth" emergency contact person computing system 150N, that is estimated to be geographically/physically, and/or temporarily, closest to the user, is then automatically identified and automatically contacted.

Computing system 100 may further include standard user interface devices such as a keyboard (not shown), a mouse (not shown), a printer (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, user computing system 100, whether available or known at the time of filing or as later developed.

Also shown in FIG. 1 is first emergency contact person computing system 150A, second emergency contact person computing system 150B, and "Nth" emergency contact person computing system 150N.

Although three emergency contact person computing systems are shown in FIG. 1, first emergency contact person computing system 150A, second emergency contact person computing system 150B, and "Nth" emergency contact person computing system 150N, are representative of any number of emergency contact person computing systems necessary to provide the ability to contact each emergency contact person listed in emergency contact list data 103.

In various embodiments, any, or all, of first emergency contact person computing system 150A, second emergency contact person computing system 150B, and "Nth" emergency contact person computing system 150N, can be any computing system as discussed herein and/or as known in the art at the time of filing and/or as developed thereafter, that includes components that can execute all, or part, of a process for automatically selecting and contacting an emergency contact person based on location in accordance with at least one of the embodiments as described herein.

As shown in FIG. 1, first emergency contact person computing system 150A, second emergency contact person computing system 150B, and "Nth" emergency contact person computing system 150N, include emergency contact person location data 159A, 159B, and 159N, respectively.

As noted above, any, or all, of emergency contact person location data 159A, 159B, and 159N includes data indicating the geographical location of first emergency contact person computing system 150A, second emergency contact person computing system 150B, and "Nth" emergency contact person computing system 150N, that is tracked/monitored using a GPS system and/or a GPS capability provided with the computing systems (not shown). In various embodiments, any, or all, of emergency contact person location data 159A, 159B, and 159N is determined based on analysis of a communication signal used and/or emitted by first emergency contact person computing system 150A, second emergency contact person computing system 150B, and "Nth" emergency contact person computing system 150N, and/or the relay stations used by first emergency contact person computing system 150A, second emergency contact person computing system 150B, and "Nth" emergency contact person computing system 150N. In various embodiments, any, or all, of emergency contact person location data 159A, 159B, and 159N is provided by first emergency contact person computing system 150A, second emergency contact person computing system 150B, and "Nth" emergency contact person computing system 150N, respectively, via one or more data links. In various embodiments, any, or all, of emergency contact person location data 159A, 159B, and 159N is determined and/or provided by any method, means, mechanism, or procedure for determining a position of a computing system as discussed herein, and/or as known in the art at the time of filing, and/or as developed after the time of filing.

As also seen in FIG. 1, process computing system 120 typically includes a central processing unit (CPUs) 121, and a communications interface 125.

In one embodiment, process computing system 120 includes: at least part of emergency contact list data 103 from user computing system 100 and communication interface 112, via communications channel 140D; at least part of user location data 109 from user computing system 100 and communication interface 112, via communications channel 140D; at least part of emergency contact person location data 159A, 159B, and 159N from first emergency contact person computing system 150A, second emergency contact person computing system 150B, and "Nth" emergency contact person computing system 150N, respectively, and communication interfaces 155A, 155B, and 155N, respectively, via communications channel 140A, 140B, and 140N, respectively.

In one embodiment, emergency contact list data 103, user location data 109, and emergency contact person location data 159A, 159B, and 159N are processed by analysis engine 123 under the direction of CPU 121 to determine the physical distance between the geographical locations of first emergency contact person computing system 150A, second emergency contact person computing system 150B, and "Nth" emergency contact person computing system 150N, and the location of user computing system 100.

In one embodiment, an identified one of first emergency contact person computing system 150A, second emergency contact person computing system 150B, and "Nth" emergency contact person computing system 150N, that is estimated to be geographically/physically, and/or temporarily, closest to the user, is then automatically identified and automatically contacted.

In one embodiment, traffic data/arrival time data 161 is obtained from one or more sources, such as traffic/arrival time estimation system 160, and incorporated so that the one of first emergency contact person computing system 150A, second emergency contact person computing system 150B, and "Nth" emergency contact person computing system 150N, that is estimated to be temporally nearest to the location of user computing system 100 is selected and contacted automatically.

In one embodiment, any, or all, of communications channels 140A, 140B, 140N, 140C, and 140D can be, but are not limited to: a mobile communication link, such as a mobile phone link; a land-line phone link; a cable-based communications link; a satellite communications link; the Internet, a cloud, or other network communications link; and/or any other communications link, or combination of communications links, as discussed herein, and/or as known in the art at the time of filing, and/or as developed after the time of filing.

In one embodiment, computing systems 100. 150A, 150B, 150N, and 120, are part of a cloud computing environment.

Those of skill in the art will readily recognize that the components shown in FIG. 1, and their respective sub-components are shown for illustrative purposes only and that architectures with more or fewer components can implement, and benefit from, the invention. Moreover, one or more components may be located remotely from their respective system and accessed via network, as discussed herein. In addition, the particular type of, and configuration of, the computing systems are not relevant.

Process

Herein, the terms "user" and "user consumer" are used interchangeably to denote any party and/or entity that interfaces with, and/or to whom information is provided by, a process for automatically selecting and contacting an emergency contact person based on location, and/or a person and/or entity that interfaces with, and/or to whom information is provided by, a process for automatically selecting and contacting an emergency contact person based on location, and/or a legal guardian of person and/or entity that interfaces with, and/or to whom information is provided by, a process for automatically selecting and contacting an emergency contact person based on location, and/or an authorized agent of any party and/or person and/or entity that interfaces with, and/or to whom information is provided by, a process for automatically selecting and contacting an emergency contact person based on location.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

In accordance with one embodiment, a system and method for automatically selecting and contacting an emergency contact person based on location includes a process for automatically selecting and contacting an emergency contact person based on location whereby an emergency contact list including two or more emergency contact persons designated by the user, and contact information for the two or more emergency contact persons, is created. In one embodiment, the emergency contact persons on the emergency contact list have their location tracked, in one embodiment via one or more mobile computing systems associated with the emergency contact persons.

In one embodiment, the emergency contact list is associated with one or more buttons, icons, voice data, and/or features, on a user computing system associated with the user such that when the one or more buttons, icons, voice data, and/or features are activated, the location of the emergency is determined, e.g., the location of the user computing system is determined, and the locations of the emergency contact persons on the emergency contact list are automatically determined. In one embodiment, the emergency contact person that is estimated to be geographically/physically, and/or temporarily, closest to the user, is then automatically identified and automatically contacted.

Figure 2:
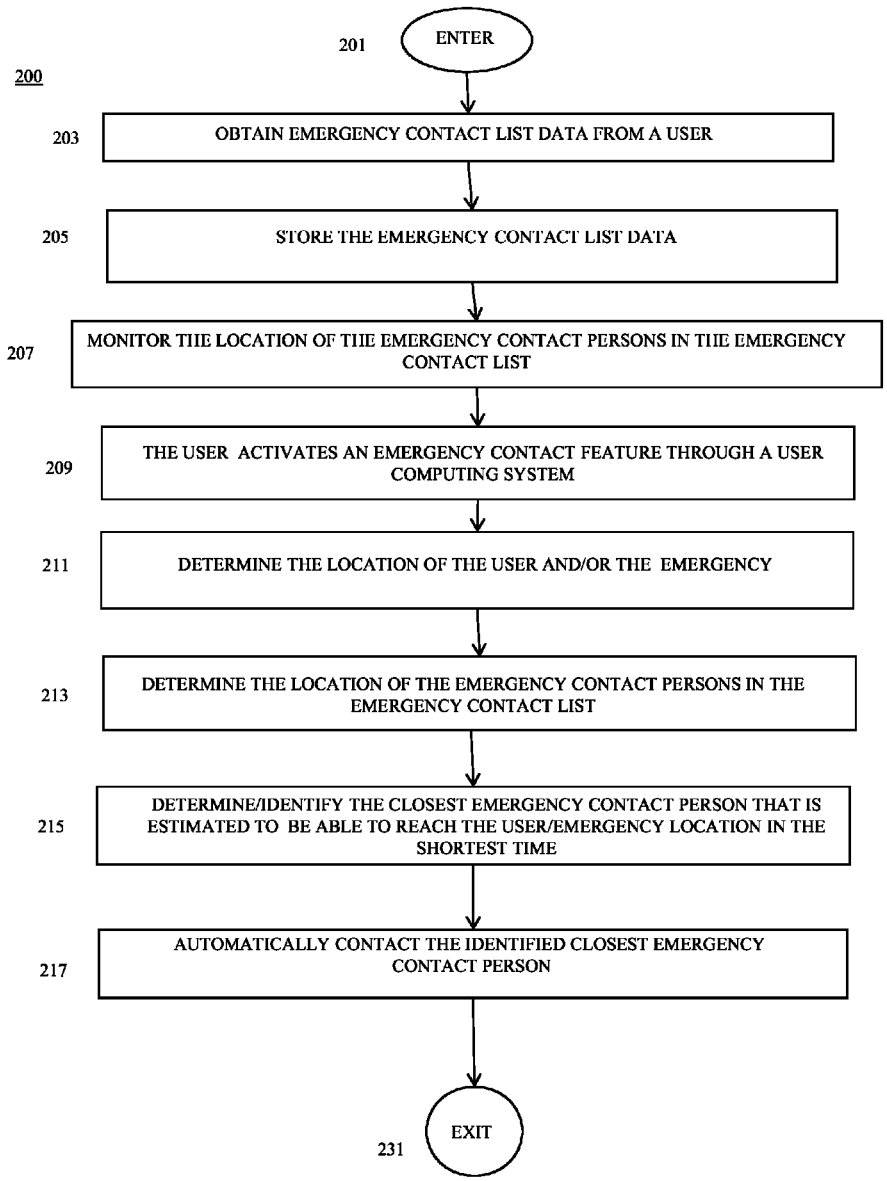
FIG. 2 is a flow chart depicting a process for automatically selecting and contacting an emergency contact person based on location in accordance with one embodiment.

FIG. 2 is a flow chart depicting a process for automatically selecting and contacting an emergency contact person based on location 200 in accordance with one embodiment. Process for automatically selecting and contacting an emergency contact person based on location 200 begins at ENTER OPERATION 201 of FIG. 2 and process flow proceeds to OBTAIN EMERGENCY CONTACT LIST DATA FROM A USER OPERATION 203.

In one embodiment, at OBTAIN EMERGENCY CONTACT LIST DATA FROM A USER OPERATION 203 an emergency contact list, including two or more emergency contact persons designated by the user, and contact information/data for the two or more emergency contact persons, is created.

In one embodiment, at OBTAIN EMERGENCY CONTACT LIST DATA FROM A USER OPERATION 203 the emergency contact list data, i.e., data indicating the emergency contact persons, and the contact information for the emergency contact persons, is provided by the user through one or more user computing systems, such as user computing system 100 of FIG. 1.

As noted above, as used herein, the term "computing system", includes, but is not limited to: a desktop computing system; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

Returning to FIG. 2, in one embodiment, at OBTAIN EMERGENCY CONTACT LIST DATA FROM A USER OPERATION 203 the emergency contact list data, i.e., data indicating the emergency contact persons and the contact information for the emergency contact persons, is provided by the user through one or more user computing systems, such as user computing system 100 of FIG. 1, that is a mobile computing system.

As also noted above, herein, the terms "mobile computing system" and "mobile device" are used interchangeably and include, but are not limited to: a portable computer; a two-way pager; a cellular telephone; a smart phone; a tablet computing system; a notebook computing system; a digital wireless telephone; a Personal Digital Assistant (PDA); a media player, i.e., an MP3 player and/or other music and/or video player; an Internet appliance; or any other mobile device and/or computing system that includes components that can execute all, or part, of any one of the processes and/or operations as described herein. In addition, as used herein, the term mobile computing system and/or mobile device, can denote, but is not limited to, computing systems made up of multiple: wireless devices; cellular telephones; smart phones; digital telephones; two-way pagers; PDAs; media players; or any desired combination of these devices and/or computing systems, that are coupled to perform the processes and/or operations as described herein.

In one embodiment, one or more mobile computing systems are connected by one or more mobile communication networks and/or communications channels, such as, but not limited to: communications channels 140A, 140B, 140N, 140C, and 140D of FIG. 1 and/or any general network, communications network, or general network/communications network system; a cellular network; a wireless network; a combination of different network types, or other wireless, wired, and/or a wireless and wired combination network; a public network; a private network; a satellite network; a cable network; or any other network capable of allowing communication between two or more computing systems, as discussed herein, and/or available or known at the time of filing, and/or as developed after the time of filing.

In various embodiments, the contact information for the two or more emergency contact persons designated by the user of OBTAIN EMERGENCY CONTACT LIST DATA FROM A USER OPERATION 203 may be a telephone number for the emergency contact person, an e-mail address for the emergency contact person, SMS message contact data for the emergency contact person, and/or any other contact information for the emergency contact person as discussed herein, and/or as known/available in the art at the time of filing, and/or as developed/made available after the time of filing.

In one embodiment, at OBTAIN EMERGENCY CONTACT LIST DATA FROM A USER OPERATION 203 the emergency contact persons on the emergency contact list agree to be listed and agree to have their location tracked, in one embodiment via one or more mobile computing systems, such as emergency contact person computing systems 150A, 150B, and 150N of FIG. 1, associated with the emergency contact persons.

Returning to FIG. 2, in one embodiment, once an emergency contact list including two or more emergency contact persons designated by the user, and contact information/data for the two or more emergency contact persons, is created at OBTAIN EMERGENCY CONTACT LIST DATA FROM A USER OPERATION 203, process flow proceeds to STORE THE EMERGENCY CONTACT LIST DATA OPERATION 205.

In one embodiment, at STORE THE EMERGENCY CONTACT LIST DATA OPERATION 205 data representing the emergency contact list of OBTAIN EMERGENCY CONTACT LIST DATA FROM A USER OPERATION 203 is saved/stored.

In one embodiment, at STORE THE EMERGENCY CONTACT LIST DATA OPERATION 205 data representing the emergency contact list of OBTAIN EMERGENCY CONTACT LIST DATA FROM A USER OPERATION 203 is saved/stored locally on a user computing system, such as user computing system 100 of FIG. 1, in a memory, such as memory 101, as emergency contact list data 103.

Returning to FIG. 2, in one embodiment, at STORE THE EMERGENCY CONTACT LIST DATA OPERATION 205 data representing the emergency contact list of OBTAIN EMERGENCY CONTACT LIST DATA FROM A USER OPERATION 203 is saved/stored remotely on a process computing system, such as process computing system 120 of FIG. 1, as emergency contact list data 103.

Returning to FIG. 2, in one embodiment, at STORE THE EMERGENCY CONTACT LIST DATA OPERATION 205 data representing the emergency contact list of OBTAIN EMERGENCY CONTACT LIST DATA FROM A USER OPERATION 203 is saved/stored in a database.

As used herein, the term "database" includes, but is not limited to, any data storage mechanism known at the time of filing or as developed thereafter, such as, but not limited to: a data storage device; a designated server system or computing system, or a designated portion of one or more server systems or computing systems; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as discussed herein, known at the time of filing, or as developed thereafter.

In one embodiment, at STORE THE EMERGENCY CONTACT LIST DATA OPERATION 205 data representing the emergency contact list of OBTAIN EMERGENCY CONTACT LIST DATA FROM A USER OPERATION 203 is saved/stored using any process, procedure, mechanism, and means, as discussed herein, and/or as known in the art/available at the time of filing, and/or as developed/made available after the time of filing.

In one embodiment, once data representing the emergency contact list of OBTAIN EMERGENCY CONTACT LIST DATA FROM A USER OPERATION 203 is saved/stored at STORE THE EMERGENCY CONTACT LIST DATA OPERATION 205, process flow proceeds to MONITOR THE LOCATION OF THE EMERGENCY CONTACT PERSONS IN THE EMERGENCY CONTACT LIST OPERATION 207.

In one embodiment, at MONITOR THE LOCATION OF THE EMERGENCY CONTACT PERSONS IN THE EMERGENCY CONTACT LIST OPERATION 207 the geographical locations of computing systems associated with the emergency contact persons on the emergency contact list of OBTAIN EMERGENCY CONTACT LIST DATA FROM A USER OPERATION 203 are tracked/monitored.

As noted above, in one embodiment, at OBTAIN EMERGENCY CONTACT LIST DATA FROM A USER OPERATION 203 the emergency contact persons on the emergency contact list agree to be listed and agree to have their location tracked at MONITOR THE LOCATION OF THE EMERGENCY CONTACT PERSONS IN THE EMERGENCY CONTACT LIST OPERATION 207, in one embodiment via one or more mobile computing systems, such as emergency contact person computing systems 150A, 150B, and 150N of FIG. 1, associated with the emergency contact persons.

Returning to FIG. 2, in one embodiment, at MONITOR THE LOCATION OF THE EMERGENCY CONTACT PERSONS IN THE EMERGENCY CONTACT LIST OPERATION 207 the geographical locations of mobile computing systems, such as emergency contact person computing systems 150A, 150B, and 150N of FIG. 1, associated with the emergency contact persons on the emergency contact list of OBTAIN EMERGENCY CONTACT LIST DATA FROM A USER OPERATION 203 are tracked/monitored.

Returning to FIG. 2, in one embodiment, at MONITOR THE LOCATION OF THE EMERGENCY CONTACT PERSONS IN THE EMERGENCY CONTACT LIST OPERATION 207 the geographical locations of the emergency contact person computing systems associated with the emergency contact persons on the emergency contact list are tracked/monitored using a GPS system and/or a GPS capability provided with the computing systems.

In various embodiments, the geographical locations of the emergency contact person computing systems associated with the emergency contact persons on the emergency contact list are determined based on analysis of a communication signal used and/or emitted by the emergency contact person computing systems and/or the relay stations used by the emergency contact person computing systems.

In various embodiments, the geographical locations of the emergency contact person computing systems associated with the emergency contact persons on the emergency contact list are provided by the emergency contact person computing systems themselves via one or more data links.

In various embodiments, the geographical locations of the emergency contact person computing systems associated with the emergency contact persons on the emergency contact list are determined and/or provided by any method, means, mechanism, or procedure for determining a position of a computing system as discussed herein, and/or as known in the art at the time of filing, and/or as developed after the time of filing.

Numerous means, methods, systems, algorithms, procedures, and processes are known in the art for obtaining location data associated with a computing system. Consequently, a more detailed discussion of any particular means, method, system, algorithm, procedure, and process for obtaining location data associated with a computing system is omitted here to avoid detracting from the invention.

In one embodiment, at MONITOR THE LOCATION OF THE EMERGENCY CONTACT PERSONS IN THE EMERGENCY CONTACT LIST OPERATION 207 a two-way synchronization is performed at periodic intervals such that the geographical locations of the emergency contact person computing systems associated with the emergency contact persons on the emergency contact list is obtained and stored locally on the user computing system. As discussed below, in one embodiment, the nearest emergency contact person is also determined at periodic intervals automatically to minimize processing wait time in the event of an emergency.

In one embodiment, once the geographical locations of computing systems associated with the emergency contact persons on the emergency contact list of OBTAIN EMERGENCY CONTACT LIST DATA FROM A USER OPERATION 203 are tracked/monitored at MONITOR THE LOCATION OF THE EMERGENCY CONTACT PERSONS IN THE EMERGENCY CONTACT LIST OPERATION 207, process flow proceeds to THE USER ACTIVATES AN EMERGENCY CONTACT FEATURE THROUGH A USER COMPUTING SYSTEM OPERATION 209.

In one embodiment, at THE USER ACTIVATES AN EMERGENCY CONTACT FEATURE THROUGH A USER COMPUTING SYSTEM OPERATION 209 the emergency contact list data of STORE THE EMERGENCY CONTACT LIST DATA OPERATION 205 is associated with one or more buttons, icons, voice data, and/or features on the user computing system such that when the one or more buttons, icons, voice data, and/or features on the user computing system are activated, the emergency contact person that is estimated to be geographically/physically, and/or temporarily, closest to the user, i.e., the user computing system or an emergency location designated by the user through the user computing system, is determined.

In one embodiment, at THE USER ACTIVATES AN EMERGENCY CONTACT FEATURE THROUGH A USER COMPUTING SYSTEM OPERATION 209 the one or more buttons, icons, voice data, and/or features on the user computing system associated with the emergency contact list data are activated, e.g., the user activates the emergency contact feature.

In one embodiment, one or more buttons, icons, voice data, and/or features, are displayed as part of an activation display, such as activation display 113 of FIG. 1, displayed on a display device, such as display device 111 of FIG. 1, on a user computing system, such as user computing system 100 of FIG. 1.

Returning to FIG. 1, in one embodiment, once the user activates the emergency contact feature at THE USER ACTIVATES AN EMERGENCY CONTACT FEATURE THROUGH A USER COMPUTING SYSTEM OPERATION 209 process flow proceeds to DETERMINE THE LOCATION OF THE USER AND/OR THE EMERGENCY OPERATION 211.

In one embodiment, at DETERMINE THE LOCATION OF THE USER AND/OR THE EMERGENCY OPERATION 211, once the one or more buttons, icons, voice data, and/or features on the user computing system are activated at THE USER ACTIVATES AN EMERGENCY CONTACT FEATURE THROUGH A USER COMPUTING SYSTEM OPERATION 209, the location of the emergency is determined, e.g., the location of the user computing system is determined, or an emergency location designated by the user is determined.

In one embodiment, at DETERMINE THE LOCATION OF THE USER AND/OR THE EMERGENCY OPERATION 211 the geographical location of the user computing system is tracked/monitored using a GPS system and/or a GPS capability provided with the user computing system.

In various embodiments, at DETERMINE THE LOCATION OF THE USER AND/OR THE EMERGENCY OPERATION 211 the geographical location of the user computing system is determined based on analysis of a communication signal used and/or emitted by the user computing system and/or the relay stations used by the user computing system.

In various embodiments, at DETERMINE THE LOCATION OF THE USER AND/OR THE EMERGENCY OPERATION 211 the geographical location of the user computing system is provided by the user computing system itself via one or more data links.

In various embodiments, at DETERMINE THE LOCATION OF THE USER AND/OR THE EMERGENCY OPERATION 211 the geographical location of the user computing system is determined and/or provided by any method, means, mechanism, or procedure for determining a position of a computing system as discussed herein, and/or as known in the art at the time of filing, and/or as developed after the time of filing.

As noted above, numerous means, methods, systems, algorithms, procedures, and processes are known in the art for obtaining location data associated with a computing system. Consequently, a more detailed discussion of any particular means, method, system, algorithm, procedure, and process for obtaining location data associated with a computing system is omitted here to avoid detracting from the invention.

As also noted above, in one embodiment, a two-way synchronization is performed at periodic intervals such that geographical location of the user computing system and the geographical location information of the two or more emergency contact persons on the emergency contact list are obtained and stored locally on the user computing system. In one embodiment, the nearest emergency contact person is also determined at periodic intervals automatically to minimize processing wait time in the event of an emergency.

In various embodiments, at DETERMINE THE LOCATION OF THE USER AND/OR THE EMERGENCY OPERATION 211 the geographical location of the emergency is determined by the user providing the geographical location of the emergency using the user computing system. In these cases, it is assumed the emergency location is different from the geographic location of the user computing system, or the geographic location of the user computing system cannot be determined.

In one embodiment, once the geographic location of the user computing system is determined, or an emergency location designated by the user is determined, at DETERMINE THE LOCATION OF THE USER AND/OR THE EMERGENCY OPERATION 211, process flow proceeds to DETERMINE THE LOCATION OF THE EMERGENCY CONTACT PERSONS IN THE EMERGENCY CONTACT LIST OPERATION 213.

In one embodiment, at DETERMINE THE LOCATION OF THE EMERGENCY CONTACT PERSONS IN THE EMERGENCY CONTACT LIST OPERATION 213 the approximate geographic locations of the two or more emergency contact persons on the emergency contact list is determined.

In one embodiment, at DETERMINE THE LOCATION OF THE EMERGENCY CONTACT PERSONS IN THE EMERGENCY CONTACT LIST OPERATION 213 the approximate geographic locations of the two or more emergency contact persons on the emergency contact list is determined by obtaining emergency contact person location data, such as emergency contact person location data 159A, 159B, and 159N, of FIG. 1, from emergency contact person computing systems, such as emergency contact person computing systems 150A, 150B, and 150N, of FIG. 1.

Returning to FIG. 2, as noted above, in one embodiment, a two-way synchronization is performed at periodic intervals such that geographical location of the user computing system and the geographical location information of the two or more emergency contact persons on the emergency contact list are obtained and stored locally on the user computing system. In one embodiment, the nearest emergency contact person is also determined at periodic intervals automatically to minimize processing wait time in the event of an emergency.

In one embodiment, once the approximate geographic locations of the two or more emergency contact persons on the emergency contact list is determined at DETERMINE THE LOCATION OF THE EMERGENCY CONTACT PERSONS IN THE EMERGENCY CONTACT LIST OPERATION 213, process flow proceeds to DETERMINE/IDENTIFY THE CLOSEST EMERGENCY CONTACT PERSON THAT IS ESTIMATED TO BE ABLE TO REACH THE USER/EMERGENCY LOCATION IN THE SHORTEST TIME OPERATION 215.

In one embodiment, at DETERMINE/IDENTIFY THE CLOSEST EMERGENCY CONTACT PERSON THAT IS ESTIMATED TO BE ABLE TO REACH THE USER/EMERGENCY LOCATION IN THE SHORTEST TIME OPERATION 215, data indicating the geographic location of the user computing system, and/or the emergency, of DETERMINE THE LOCATION OF THE USER AND/OR THE EMERGENCY OPERATION 211 and data indicating the approximate geographic locations of the two or more emergency contact persons on the emergency contact list of DETERMINE THE LOCATION OF THE EMERGENCY CONTACT PERSONS IN THE EMERGENCY CONTACT LIST OPERATION 213 is analyzed to determine the emergency contact person on the emergency contact list of STORE THE EMERGENCY CONTACT LIST DATA OPERATION 205 that is estimated to be geographically/physically, and/or temporarily, closest to the geographic location of the user computing system, and/or the emergency.

In one embodiment, at DETERMINE/IDENTIFY THE CLOSEST EMERGENCY CONTACT PERSON THAT IS ESTIMATED TO BE ABLE TO REACH THE USER/EMERGENCY LOCATION IN THE SHORTEST TIME OPERATION 215, data indicating the geographic location of the user computing system, and/or the emergency, and data indicating the approximate geographic locations of the two or more emergency contact persons on the emergency contact list, is analyzed using an analysis engine, such as analysis engine 123 of FIG. 1, under the direction of one or more processors, such as CPU 121 and/or CPU 105 of FIG. 1, associated with one or more computing systems, such as process computing system 120 and/or user computing system 100 of FIG. 1, to determine the emergency contact person on the emergency contact list that is estimated to be geographically/physically, and/or temporarily, closest to the geographic location of the user computing system, and/or the emergency.

Returning to FIG. 2, in one embodiment, data indicating the physical geographical locations of the two or more emergency contact persons and the location of the user computing system, and/or emergency, is automatically analyzed by one or more processors to determine the physical distance between the geographical locations of the two or more emergency contact persons on the emergency contact list and the geographical location of the user computing system, and/or emergency.

In one embodiment, traffic data/arrival time data, such as traffic/arrival time data 161 of FIG. 1, is obtained from one or more sources, such as traffic/arrival time estimation system 160 of FIG. 1, and incorporated so that the emergency contact person that is estimated to be temporally nearest to the location of the emergency is determined based on the physical geographical locations of the two or more emergency contact persons on the emergency contact list, the physical distance between the geographical locations of the two or more emergency contact persons on the emergency contact list and the location of the emergency, and the estimated actual time it will take the two or more emergency contact persons on the emergency contact list to reach the location of the emergency including traffic delays/issues.

Numerous means, methods, systems, algorithms, procedures, and processes are known in the art for obtaining and determining traffic/arrival time data. For instance, Google Maps™ includes a live traffic layer. Consequently, a more detailed discussion of any particular means, method, system, algorithm, procedure, and process for obtaining and determining traffic/arrival time data is omitted here to avoid detracting from the invention.

In one embodiment, once data indicating the geographic location of the user computing system, and/or the emergency, of DETERMINE THE LOCATION OF THE USER AND/OR THE EMERGENCY OPERATION 211 and data indicating the approximate geographic locations of the two or more emergency contact persons on the emergency contact list of DETERMINE THE LOCATION OF THE EMERGENCY CONTACT PERSONS IN THE EMERGENCY CONTACT LIST OPERATION 213 is analyzed to determine the emergency contact person on the emergency contact list of STORE THE EMERGENCY CONTACT LIST DATA OPERATION 205 that is estimated to be geographically/physically, and/or temporarily, closest to the geographic location of the user computing system, and/or the emergency, at DETERMINE/ IDENTIFY THE CLOSEST EMERGENCY CONTACT PERSON THAT IS ESTIMATED TO BE ABLE TO REACH THE USER/EMERGENCY LOCATION IN THE SHORTEST TIME OPERATION 215, process flow proceeds to AUTOMATICALLY CONTACT THE IDENTIFIED CLOSEST EMERGENCY CONTACT PERSON OPERATION 217.

In one embodiment, at AUTOMATICALLY CONTACT THE IDENTIFIED CLOSEST EMERGENCY CONTACT PERSON OPERATION 217 the emergency contact person that is estimated to be geographically/physically, and/or temporarily, closest to the geographic location of the user computing system, and/or the emergency, of DETERMINE/ IDENTIFY THE CLOSEST EMERGENCY CONTACT PERSON THAT IS ESTIMATED TO BE ABLE TO REACH THE USER/EMERGENCY LOCATION IN THE SHORTEST TIME OPERATION 215 is selected and contacted automatically using the contact information for the selected emergency contact person from the emergency contact list of STORE THE EMERGENCY CONTACT LIST DATA OPERATION 205.

As noted above, in various embodiments, the contact information for the selected emergency contact person may be a telephone number for the emergency contact person, an e-mail address for the emergency contact person, SMS message contact data for the emergency contact person, and/or any other contact information for the selected emergency contact person as discussed herein, and/or as known/available in the art at the time of filing, and/or as developed/made available after the time of filing.

In one embodiment, at AUTOMATICALLY CONTACT THE IDENTIFIED CLOSEST EMERGENCY CONTACT PERSON OPERATION 217 in addition to, or in place of, contacting the nearest emergency contact person, a determination of the nearest emergency services, such as the nearest fire, medical, hospital, or police, service is made and the identified nearest emergency service is automatically contacted. This feature is of particular benefit in countries/regions that have not adopted a universal emergency contact number such as "911".

In one embodiment, once the emergency contact person that is estimated to be geographically/physically, and/or temporarily, closest to the geographic location of the user computing system, and/or the emergency, of DETERMINE/ IDENTIFY THE CLOSEST EMERGENCY CONTACT PERSON THAT IS ESTIMATED TO BE ABLE TO REACH THE USER/EMERGENCY LOCATION IN THE SHORTEST TIME OPERATION 215 is selected and contacted automatically using the contact information for the selected emergency contact person from the emergency contact list of STORE THE EMERGENCY CONTACT LIST DATA OPERATION 205 at AUTOMATICALLY CONTACT THE IDENTIFIED CLOSEST EMERGENCY CONTACT PERSON OPERATION 217, process flow proceeds to EXIT OPERATION 231.

In one embodiment, at EXIT OPERATION 231, process for automatically selecting and contacting an emergency contact person based on location 200 is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for automatically selecting and contacting an emergency contact person based on location 200, a process is provided that, once activated by the user, automatically selects an emergency contact person, from a list of emergency contact persons, that is physically, and/or temporally, closest to the user and/or the emergency location, i.e., automatically selects the emergency contact person that can get to the user and/or the emergency location in the shortest estimated time.

As discussed in more detail above, using the above embodiments, with little or no modification and/or consumer input, there is considerable flexibility, adaptability, and opportunity for customization to meet the specific needs of various consumers under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "activating", "accessing", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "monitoring", "obtaining", "processing", "providing", "receiving", "requesting", "saving", "sending", "storing", "transferring", "transforming", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method for automatically selecting and contacting an emergency contact person based on location comprising:
    receiving emergency contact list data from a party through a party computing system of the party, the emergency contact list data including data identifying at least two emergency contact persons and contact information associated with the at least two emergency contact persons;
    storing the emergency contact list data;
    the party activating an emergency contact feature through the party computing system;
    determining a geo-location of the emergency that caused the party to activate the emergency contact feature;
    determining a geo-location of individual ones of the at least two emergency contact persons from individual geo-locations of emergency contact person computing systems of individual ones of the at least two emergency contact persons;
    analyzing data indicating the geo-location of the emergency and data indicating the geo-location of the emergency contact persons to determine an emergency contact person of the at least two emergency contact persons that is closest to the geo-location of the emergency;
    using the contact information associated with the previously determined closest emergency contact person contact the previously determined closest emergency contact person;
    obtaining traffic/arrival time data indicating an estimated time between the geo-location of the emergency and the geo-location of the emergency contact persons;
    analyzing the data indicating the geo-location of the emergency, the data indicating the geo-location of the emergency contact persons, and the traffic/arrival time data to determine the emergency contact person of the at least two emergency contact persons that is estimated to be temporally closest to the geo-location of the emergency; and
    using the contact information associated with the emergency contact person that is estimated to be temporally closest to the geo-location of the emergency to contact the emergency contact person that is estimated to be temporally closest to the geo-location of the emergency.

2. The method for automatically selecting and contacting an emergency contact person based on location of claim 1, wherein;
    the contact information associated with the at least two emergency contact persons of emergency contact list data is selected from at least one of the group of contact information consisting of:
    a telephone number for the emergency contact person and/or emergency contact person computing system;
    an e-mail address for the emergency contact person; and
    SMS message contact data for the emergency contact person.

3. The method for automatically selecting and contacting an emergency contact person based on location of claim 1, wherein;
    the party computing system is a mobile computing system.

4. The method for automatically selecting and contacting an emergency contact person based on location of claim 1, wherein;
    the party computing system is a mobile phone.

5. The method for automatically selecting and contacting an emergency contact person based on location of claim 1, wherein;
    at least one of the emergency contact person computing systems is a mobile computing system.

6. The method for automatically selecting and contacting an emergency contact person based on location of claim 1, wherein;
    at least one of the emergency contact person computing systems is a mobile phone.

7. The method for automatically selecting and contacting an emergency contact person based on location of claim 1, wherein;

the emergency contact list data is stored locally on the party computing system.

8. The method for automatically selecting and contacting an emergency contact person based on location of claim 1, wherein;
the emergency contact list data is stored remotely from the party computing system.

9. The method for automatically selecting and contacting an emergency contact person based on location of claim 1, wherein;
the geo-location of the emergency that caused the party to activate the emergency contact feature is determined using the geo-location of the party computing system.

10. The method for automatically selecting and contacting an emergency contact person based on location of claim 1, wherein;
the geo-location of the emergency that caused the party to activate the emergency contact feature is provided by the party.

11. The method for automatically selecting and contacting an emergency contact person based on location of claim 1, wherein;
the geo-location of the emergency contact person computing systems associated with the at least two emergency contact persons is provided by at least one source of geo-location data selected from at least one of the group of geo-location data sources consisting of:
a Global Positioning Satellite (GPS) system and/or a GPS capability provided with the emergency contact person computing systems;
analysis of a communication signal used and/or emitted by the emergency contact person computing systems and/or the relay stations used by the emergency contact person computing systems; and
via one or more data links with the emergency contact person computing systems.

12. The method for automatically selecting and contacting an emergency contact person based on location of claim 1, further comprising:
analyzing data indicating the geo-location of the emergency and data indicating the geo-location of the emergency contact persons to determine the emergency contact person of the at least two emergency contact persons that is physically closest to the geo-location of the emergency; and
using the contact information of the emergency contact person that is physically closest to the geo-location of the emergency to contact the emergency contact person that is physically closest to the geo-location of the emergency.

13. A computing system implemented process for automatically selecting and contacting an emergency contact person based on location comprising:
using one or more processors to receive emergency contact list data from a party through a party computing system of the party, the emergency contact list data including data identifying at least two emergency contact persons and contact information associated with the at least two emergency contact persons;
using one or more processors to store the emergency contact list data;
the party activating an emergency contact feature through a user the party computing system;
using one or more processors to determine a geo-location of the emergency that caused the party to activate the emergency contact feature;
using one or more processors to determine a geo-location of individual ones of the at least two emergency contact persons from individual geo-location of individual respective emergency contact person computing systems associated with the at least two emergency contact persons;
using one or more processors to analyze data indicating the geo-location of the emergency and data indicating the geo-location of the emergency contact persons to determine an emergency contact person of the at least two emergency contact persons that is closest to the geo-location of the emergency;
using one or more processors and the contact information associated with the previously determined closest emergency contact person to automatically contact the previously determined closest emergency contact person;
obtaining traffic/arrival time data indicating an estimated time between the geo-location of the emergency and the geo-location of the emergency contact persons;
using one or more processors to analyze the data indicating the geo-location of the emergency, the data indicating the geo-location of the emergency contact persons, and the traffic/arrival time data to determine the emergency contact person of the at least two emergency contact persons that is estimated to be temporally closest to the geo-location of the emergency; and
using one or more processors and the contact information associated with the emergency contact person that is estimated to be temporally closest to the geo-location of the emergency to contact the emergency contact person that is estimated to be temporally closest to the geo-location of the emergency.

14. The computing system implemented process for automatically selecting and contacting an emergency contact person based on location of claim 13, wherein;
the contact information associated with the at least two emergency contact persons of emergency contact list data is elected from at least one of the group of contact information consisting of:
a telephone number for the emergency contact person and/or emergency contact person computing system;
an e-mail address for the emergency contact person; and
SMS message contact data for the emergency contact person.

15. The computing system implemented process for automatically selecting and contacting an emergency contact person based on location of claim 13, wherein;
the party computing system is a mobile computing system.

16. The computing system implemented process for automatically selecting and contacting an emergency contact person based on location of claim 13, wherein;
the party computing system is a mobile phone.

17. The computing system implemented process for automatically selecting and contacting an emergency contact person based on location of claim 13, wherein;
at least one of the emergency contact person computing systems is a mobile computing system.

18. The computing system implemented process for automatically selecting and contacting an emergency contact person based on location of claim 13, wherein;
at least one of the emergency contact person computing systems is a mobile phone.

19. The computing system implemented process for automatically selecting and contacting an emergency contact person based on location of claim 13, wherein;
the emergency contact list data is stored locally on the party computing system.

20. The computing system implemented process for automatically selecting and contacting an emergency contact person based on location of claim 13, wherein;
the emergency contact list data is stored remotely from the party computing system.

21. The computing system implemented process for automatically selecting and contacting an emergency contact person based on location of claim 13, wherein;
the geo-location of the emergency that caused the party to activate the emergency contact feature is determined using the geo-location of the party computing system.

22. The computing system implemented process for automatically selecting and contacting an emergency contact person based on location of claim 13, wherein;
the geo-location of the emergency that caused the party to activate the emergency contact feature is provided by the party.

23. The computing system implemented process for automatically selecting and contacting an emergency contact person based on location of claim 13, wherein;
the geo-location of the emergency contact person computing systems associated with the at least two emergency contact persons is provided by at least one source of geo-location data selected from at least one of the group of geo-location data sources consisting of:
a GPS system and/or a GPS capability provided with the emergency contact person computing systems;
analysis of a communication signal used and/or emitted by the emergency contact person computing systems and/or the relay stations used by the emergency contact person computing systems; and
via one or more data links with the emergency contact person computing systems.

24. The computing system implemented process for automatically selecting and contacting an emergency contact person based on location of claim 13, further comprising:
using one or more processors to analyze data indicating the geo-location of the emergency and data indicating the geo-location of the emergency contact persons to determine the emergency contact person of the at least two emergency contact persons that is physically closest to the geo-location of the emergency; and
using one or more processors and the contact information associated with the emergency contact person that is physically closest to the geo-location of the emergency to contact the emergency contact person that is physically closest to the geo-location of the emergency.

25. A system for automatically selecting and contacting an emergency contact person based on location comprising:
a party computing system, the party computing system being associated with a party and configured to provide geo-location data of the party computing system;
two or more emergency contact person computing systems, individual ones of the emergency contact person computing systems each being of respective ones of the two or more emergency contact persons, the emergency contact person computing systems configured to provide geo-location data of the emergency contact person computing systems; and
one or more processors associated with one or more computing systems, the one or more processors associated with one or more computing systems executing a process for automatically selecting and contacting an emergency contact person based on location, the process for automatically selecting and contacting an emergency contact person based on location comprising:
receiving emergency contact list data from a party through the party computing system of the party, the emergency contact list data including data identifying the at least two emergency contact persons and contact information associated with the at least two emergency contact persons;
storing the emergency contact list data;
the party activating an emergency contact feature through the party computing system;
determining a geo-location of the emergency that caused the party to activate the emergency contact feature;
determining geo-locations of individual ones of the at least two emergency contact persons from individual geo-locations of the emergency contact person computing systems of individual ones of the at least two emergency contact persons;
analyzing data indicating the geo-location of the emergency and data indicating the geo-location of the emergency contact persons to determine an emergency contact person of the at least two emergency contact persons that is closest to the geo-location of the emergency;
contacting, using the contact information associated the previously determined closest emergency contact person, the emergency contact person that is closest to the geo-location of the emergency;
obtaining traffic/arrival time data indicating an estimated time between the geo-location of the emergency and the geo-location of the emergency contact persons;
using the one or more processors associated with one or more computing systems to analyze the data indicating the geo-location of the emergency, the data indicating the geo-location of the emergency contact persons, and the traffic/arrival time data to determine the emergency contact person of the at least two emergency contact persons that is estimated to be temporally closest to the geo-location of the emergency; and
using the one or more processors associated with one or more computing systems and the contact information associated with the emergency contact person that is estimated to be temporally closest to the geo-location of the emergency to contact the emergency contact person that is estimated to be temporally closest to the geo-location of the emergency.

26. The system for automatically selecting and contacting an emergency contact person based on location of claim 25, wherein;
the contact information associated with the at least two emergency contact persons of emergency contact list data is selected from at least one of the group of contact information consisting of:
a telephone number for the emergency contact person and/or emergency contact person computing system;
an e-mail address for the emergency contact person; and
SMS message contact data for the emergency contact person.

27. The system for automatically selecting and contacting an emergency contact person based on location of claim 25, wherein;
the party computing system is a mobile computing system.

28. The system for automatically selecting and contacting an emergency contact person based on location of claim 25, wherein;
the party computing system is a mobile phone.

29. The system for automatically selecting and contacting an emergency contact person based on location of claim 25, wherein;

at least one of the emergency contact person computing systems is a mobile computing system.

30. The system for automatically selecting and contacting an emergency contact person based on location of claim 25, wherein;
at least one of the emergency contact person computing systems is a mobile phone.

31. The system for automatically selecting and contacting an emergency contact person based on location of claim 25, wherein;
the emergency contact list data is stored locally on the party computing system.

32. The system for automatically selecting and contacting an emergency contact person based on location of claim 25, wherein;
the emergency contact list data is stored remotely from the party computing system.

33. The system for automatically selecting and contacting an emergency contact person based on location of claim 25, wherein;
the geo-location of the emergency that caused the party to activate the emergency contact feature is determined using the geo-location of the party computing system.

34. The system for automatically selecting and contacting an emergency contact person based on location of claim 25, wherein;
the geo-location of the emergency that caused the party to activate the emergency contact feature is provided by the party.

35. The system for automatically selecting and contacting an emergency contact person based on location of claim 25, wherein;
the geo-location of the emergency contact person computing systems associated with the at least two emergency contact persons is provided by at least one source of geo-location data selected from at least one of the group of geo-location data sources consisting of:
a GPS system and/or a GPS capability provided with the emergency contact person computing systems;
analysis of a communication signal used and/or emitted by the emergency contact person computing systems and/or the relay stations used by the emergency contact person computing systems; and
via one or more data links with the emergency contact person computing systems.

36. The system for automatically selecting and contacting an emergency contact person based on location of claim 25, further comprising:
using the one or more processors associated with one or more computing systems to analyze data indicating the geo-location of the emergency and data indicating the geo-location of the emergency contact persons to determine the emergency contact person of the at least two emergency contact persons that is physically closest to the geo-location of the emergency; and
using the one or more processors associated with one or more computing systems and the contact information associated with the emergency contact person that is physically closest to the geo-location of the emergency to contact the emergency contact person that is physically closest to the geo-location of the emergency.

* * * * *

UNITED STATES PATENT AND TRADEMARK OFFICE
CERTIFICATE OF CORRECTION

PATENT NO. : 8,509,732 B1
APPLICATION NO. : 13/429941
DATED : August 13, 2013
INVENTOR(S) : Kumar Venkatraman It is certified that error appears in the above-identified patent and that said Letters Patent is hereby corrected as shown below:

In the Claims

In Column 20, Line 16, Claim 1, after "person", insert --to--; and
In Column 21, Lines 62-63, Claim 13, after "through", delete "a user".

Signed and Sealed this
First Day of July, 2014

Michelle K. Lee
*Deputy Director of the United States Patent and Trademark Office*